(12) United States Patent
Newman et al.

(10) Patent No.: US 7,008,658 B2
(45) Date of Patent: Mar. 7, 2006

(54) APPARATUS AND METHOD FOR PROVIDING TREATMENT TO A CONTINUOUS SUPPLY OF FOOD PRODUCT BY IMPINGEMENT

(75) Inventors: Michael D. Newman, Hillsborough, NJ (US); Stephen A. McCormick, Warrington, PA (US); Helmut Dresselhaus, Brisbane (AU)

(73) Assignee: The BOC Group, Inc., Murray Hill, NJ (US)

( * ) Notice: Subject to any disclaimer, the term of this patent is extended or adjusted under 35 U.S.C. 154(b) by 252 days.

(21) Appl. No.: 10/157,368

(22) Filed: May 29, 2002

(65) Prior Publication Data

US 2003/0224092 A1    Dec. 4, 2003

(51) Int. Cl.
    *A23L 3/00*    (2006.01)
(52) U.S. Cl. .................. 426/281; 426/312; 426/320; 426/321; 426/497
(58) Field of Classification Search .............. 426/281, 426/312, 321, 320, 497
    See application file for complete search history.

(56) References Cited

U.S. PATENT DOCUMENTS

| | | |
|---|---|---|
| 2,665,217 A | 1/1954 | Meuli |
| 4,145,451 A | 3/1979 | Oles |
| 4,472,887 A | 9/1984 | Avedian et al. ................. 34/31 |
| 4,490,924 A | 1/1985 | Lambert ........................ 34/31 |
| 4,550,026 A | 10/1985 | Ando |
| 4,746,524 A | 5/1988 | Meyer |
| 4,756,919 A | 7/1988 | Cirigiano et al. |
| 4,814,154 A | 3/1989 | Doernemann et al. |
| 5,173,259 A | 12/1992 | Bordini |
| 5,208,057 A | 5/1993 | Greenley et al. |
| 5,229,072 A | 7/1993 | Tarancon |
| 5,234,703 A | 8/1993 | Guthery |
| 5,258,162 A | 11/1993 | Anderson et al. |
| 5,261,949 A | 11/1993 | Schilling ..................... 95/216 |
| 5,337,962 A | 8/1994 | Erb et al. ................. 239/424.5 |
| 5,345,079 A | 9/1994 | French et al. ................ 250/288 |
| 5,372,754 A | 12/1994 | Ono ........................... 261/142 |
| 5,376,333 A | 12/1994 | Shankland et al. |
| 5,389,390 A | 2/1995 | Kross |
| 5,408,921 A | 4/1995 | Persson et al. ................ 99/443 |
| 5,431,736 A | 7/1995 | Boer .......................... 118/726 |
| 5,440,887 A | 8/1995 | Nishizato et al. ............ 62/50.7 |
| 5,461,695 A | 10/1995 | Knoch ........................ 392/394 |
| 5,495,893 A | 3/1996 | Roberts et al. ............... 169/37 |

(Continued)

FOREIGN PATENT DOCUMENTS

CA    2193611    12/1996

(Continued)

OTHER PUBLICATIONS

Cepeda, Minerva, et al., *Effects of Leavening Acids and Dough Temperature in Wheat Flour Tortillas*, American Association of Cereal Chemists, Inc., pp. 489-494, vol. 77, No. 4, 2000.

*Primary Examiner*—Lien Tran
(74) *Attorney, Agent, or Firm*—Joshua L. Cohen; Bernard Lau

(57) ABSTRACT

An apparatus and method for providing treatment by impingement to a continuous supply of food product includes a treatment zone at an ambient pressure, a fluid delivery zone at an elevated pressure, and a circulation assembly. Impingement plates containing apertures separate the zones. When treatment fluid is drawn through the impingement apertures, jets of treatment fluid are produced and impinge upon food product traveling through the treatment zone. The apparatus can employ a conveyor mechanism to accommodate food product from a continuous supply, as opposed to batches.

5 Claims, 5 Drawing Sheets

U.S. PATENT DOCUMENTS

| | | | |
|---|---|---|---|
| 5,509,405 A | 4/1996 | Mashak | 128/203.12 |
| 5,551,251 A | 9/1996 | Ochs et al. | 62/380 |
| 5,576,035 A | 11/1996 | Bowling et al. | |
| 5,597,599 A | 1/1997 | Smith et al. | |
| 5,636,626 A | 6/1997 | Bloch et al. | 128/203.12 |
| 5,641,530 A | 6/1997 | Chen | |
| 5,730,311 A | 3/1998 | Curtis | |
| 5,735,468 A | 4/1998 | Casey | 239/425 |
| 5,810,252 A | 9/1998 | Pennamen et al. | 239/8 |
| 5,901,271 A | 5/1999 | Benzing et al. | 392/387 |
| 5,906,794 A | 5/1999 | Childers | 422/28 |
| 5,922,247 A | 7/1999 | Shoham et al. | 261/78.2 |
| 6,224,930 B1 | 5/2001 | Inglis et al. | |
| 6,265,006 B1 | 7/2001 | Inglis et al. | |
| 6,354,196 B1 | 3/2002 | Malmberg et al. | 99/443 |
| 6,468,573 B1 * | 10/2002 | Herrick et al. | 426/445 |
| 6,767,569 B1 * | 7/2004 | Marsden et al. | 426/326 |

FOREIGN PATENT DOCUMENTS

| | | |
|---|---|---|
| CA | 2241054 | 2/1999 |
| DE | 219 377 A1 | 3/1985 |
| DE | 19836913 | 2/2000 |
| EP | 0 467 668 A1 | 7/1991 |
| EP | 0 565 291 A1 | 3/1993 |
| EP | 0 600 503 A1 | 6/1994 |
| EP | 0 780 131 A2 | 12/1996 |
| EP | 0 899 017 A1 | 3/1999 |
| EP | 0 911 053 A2 | 4/1999 |
| EP | 0 939 145 A1 | 9/1999 |
| EP | 0 986 966 | 3/2002 |
| GB | 1 090 063 | 11/1967 |
| JP | 57050874 | 3/1982 |
| WO | 94/27431 | 12/1994 |

* cited by examiner

APPARATUS AND METHOD FOR PROVIDING TREATMENT TO A CONTINUOUS SUPPLY OF FOOD PRODUCT BY IMPINGEMENT

BACKGROUND OF THE INVENTION

1. Field of the Invention

The invention generally relates to a treatment apparatus for providing treatment to a food product by impingement. In one aspect, the invention relates to a treatment apparatus having a plurality of chambers, one of the chambers defining a treatment zone having an ambient pressure and permitting impingement of a treatment fluid upon a food product such that the food product is treated at the ambient pressure. In another aspect, the invention relates to a treatment apparatus having a plurality of chambers, one of the chambers defining a treatment zone having an ambient pressure and permitting impingement of a treatment fluid upon a food product, in a continuous supply of food product, such that the food product is treated at the ambient pressure.

2. Description of the Related Art

The preservation of perishable products has been, and continues to be, the focus of considerable commercial interest. By extending the shelf life of a food product, economic value can be added to that food product. Approaches to this end are many and varied (e.g., tight control of storage conditions, packaging, post and in situ applications of preservatives) and various combinations of these and other techniques are known and in practice to one extent or another.

In the context of one particular group of food products, namely baked goods (e.g., muffins, crumpets, scones, bagels, cookies, breads, etc.), all of the above techniques are in use. For example, baked goods can be placed in frozen or refrigerated storage, covered with anaerobic packaging, and/or supplemented by the addition of preservatives. When such preservatives are used, the preservative can be added to either a batter or a mix from which the baked goods are prepared. Also, the preservative can be applied to finished baked goods. With respect to the finished baked goods, application of a small amount of the preservative can extend the shelf life of the baked goods from a typical 6–8 days to an extended 14–16 days when all other conditions (e.g., packaging, storage conditions, and the like) are equal. These preservatives can include a wide variety of substances (i.e., microbiocidal substances, antimicrobial substances, etc.) such as acetic acid, lactic acid, carbonic acid, mixtures thereof, and the like.

In a typical preservative application process, a conventional treatment apparatus can be employed to administer the preservative. The conventional treatment apparatus essentially contains a movable hood in combination with a base. When in a closed relationship with one another, the hood and the base define a volume. The hood can be manipulated (e.g., raised and lowered) such that the baked goods to be treated can be inserted and removed from the volume. Further, the hood can be equipped with an entry port for receiving a treatment fluid (e.g., a preservative or a mixture containing the preservative such as a vaporized mixture of carbon dioxide and acetic acid). The base can comprise a platen, or in some cases, a platen associated with a movable base conveyor that rides upon the platen.

When the conventional treatment apparatus is in operation, the hood is raised, the baked goods riding on the base conveyor in batches are transported beneath the hood, and the base conveyor is temporarily halted. The hood is then closed over, and sealed against, the platen and/or base conveyor such that a negative pressure (e.g., a vacuum) can be drawn within the volume of the treatment apparatus. After the vacuum is drawn by evacuating atmosphere (e.g., air) from within the sealed apparatus, the treatment fluid can be fed into the treatment apparatus to coat onto and/or penetrate into the external surfaces of the baked goods. The vacuum can promote and/or accelerate absorption of the treatment fluid into the baked goods.

After the baked goods have been treated, excess treatment fluid can be exhausted, the hood of the treatment apparatus can be raised, and the batch of treated baked goods can be removed using the base conveyor. This "treatment cycle", or application of treatment fluid on a batch-by-batch basis, is normally repeated for each succeeding or successive batch and can take approximately twenty-five to thirty (25 to 30) seconds to complete.

Unfortunately, using the conventional treatment apparatus to treat baked goods on a batch-by-batch basis within a vacuum, as described above, can present a significant number of disadvantages. First, since the conventional treatment apparatus requires production of a vacuum during the treatment cycle, vacuum pumps (or other devices for drawing a vacuum) must be associated with the apparatus. These vacuum pumps can be of significant size, can consume vast amounts of energy, can require elaborate and intricate control systems, and can occupy valuable floor space. Each of these factors can add significantly to the cost of treating food products such as baked products. Thus, potential customers and users can be hesitant to purchase or employ such a treatment apparatus for economic and financial reasons.

Also, since baked goods are typically delivered to a treatment apparatus in an indexed array, further difficulties can arise. An indexed array is produced from a continuous supply of baked goods and is normally used and maintained throughout a significant portion of the baked good preparation process. However, the indexed arrays of baked goods are not compatible with the batch-by-batch treatment offered by the conventional treatment apparatus. Therefore, just prior to encountering the treatment apparatus, the baked goods must be assembled into the batches. Only then can the conventional treatment apparatus treat the baked goods as described above. After treatment, the indexed arrays are usually restored to promote further processing, such as packaging. Thus, the batches are disassembled, the baked goods are collated, and then indexed arrays are reformed. Converting arrays to batches, and batches to arrays, can add time delays in the treatment process. Likewise, conversion can require expensive additional equipment. This additional equipment can occupy valuable floor space, present elaborate controls, require an equipment technician or operator, consume large amounts of energy, and the like. Both the time delays and necessary additional equipment can add to the cost of the baked good treatment process.

Additionally, when the conventional treatment apparatus is imbedded within a typical treatment fluid generation system, a buffer tank is required. Buffer tanks typically comprise either heated or vacuum jacketed devices that are capable of receiving, storing, and expelling treatment fluid. Because the batch-by-batch basis of treatment is used with the conventional treatment apparatus, the fluid generation system will produce the treatment fluid faster than the treatment apparatus can apply the treatment fluid. Thus, the buffer tank is employed to accommodate the excess treatment fluid by acting as a reservoir. The buffer tank permits continuous receipt, and periodic discharge, of the treatment fluid.

Unfortunately, buffer tanks are generally at least ten times the volume of the treatment apparatus to inhibit pressure changes during the application of the treatment fluid. Also, buffer tanks can require multiple modulating control valves, pressure regulators, and a control system. Therefore, buffer tanks can cause time delays and additional costs into the typical fluid generation system using a conventional treatment apparatus.

Thus, an apparatus and method for providing treatment to a food product at an ambient pressure would be highly desirable since such an apparatus and method would eliminate the need for a vacuum pump. Likewise, an apparatus and method for providing treatment to a continuous supply of food product would be highly desirable since such an apparatus and method would eliminate the need for a buffer tank as well as batch assembly and disassembly equipment.

SUMMARY OF THE INVENTION

In one aspect, the invention provides an apparatus for applying treatment fluid to a food product. The apparatus comprises a housing, a first chamber in the housing, a second chamber in the housing, a separation means, and a circulation means.

The first chamber is adapted to receive treatment fluid while the second chamber has an entry and an exit for the food product. The second chamber is adapted to receive the food product to which the treatment fluid is to be applied.

The separation means is disposed in the housing to separate the first and second chambers. The separation means has a passage means constructed and arranged in the separation means to provide fluid communication between the first and second chambers and to control the concentration of the treatment fluid introduced into the second chamber.

The circulation means is in communication with the first and second chambers and draws the treatment fluid through the passage means onto the food product and circulates unused treatment fluid to the first chamber.

In another aspect, the invention provides a method of impinging a food product with treatment fluid. The method comprises the steps of providing a treatment fluid at a first zone and a food product to be treated at a second zone and drawing the treatment fluid from the first zone into the second zone through a passageway of select construction.

The treatment fluid is then drawn from the passageway into the second zone as a jet spray. The food product in the second zone is impinged with the jet spray of the treatment fluid. The unused treatment fluid is circulated from the second zone to the first zone.

BRIEF DESCRIPTION OF THE DRAWINGS

Embodiments of the invention are disclosed with reference to the accompanying drawings and are for illustrative purposes only. The invention is not limited in its application to the details of construction, or the arrangement of the components, illustrated in the drawings. The invention is capable of other embodiments or of being practiced or carried out in other various ways. Like reference numerals are used to indicate like components.

DETAILED DESCRIPTION OF THE PREFERRED EMBODIMENTS

The present invention is described below in the context of applying a treatment fluid containing a preservative (e.g., a mixture of carbon dioxide and acetic acid) to a baked good, although the invention can be employed with, and has applicability to, many different application processes.

Figure 1:
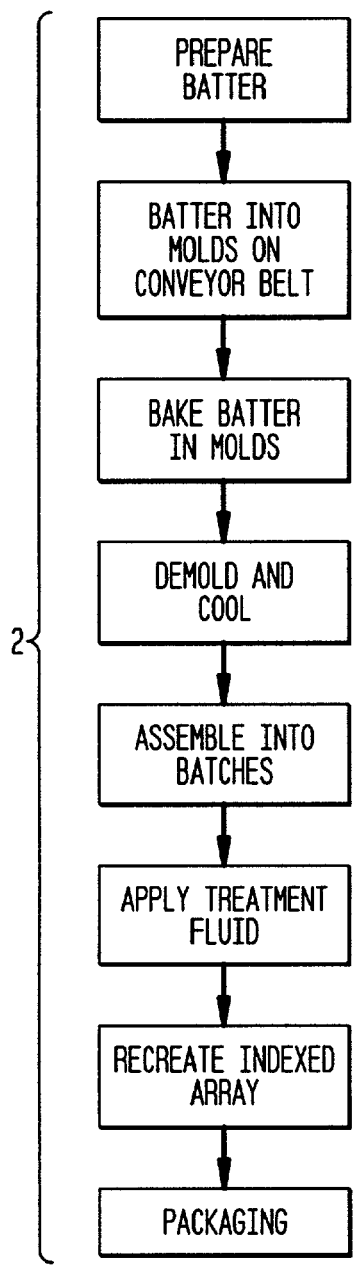
FIG. 1 illustrates a schematic flow diagram of one embodiment of a process for preparing a baked food product.

Referring to FIG. 1, a low diagram 2 for preparation of commercial quantities of a food product, for example a baked good (e.g., muffin, crumpet, scone, bagel, cookie., bread, and the like) is illustrated. Batter is prepared and then poured into molds that are either carried on, or form a part of, a conveyor mechanism. The conveyor mechanism moves the batter through a baking zone in which the batter is fully baked.

Upon leaving the baking zone, the baked good is de-molded, typically onto a second conveyor mechanism. The de-molding procedure typically deposits the baked goods upon the second conveyor mechanism such that the baked goods are arranged in an indexed array. The indexed array of baked goods are then conveyed through a cooling tunnel to bring the baked goods to a temperature appropriate for packaging (e.g., room temperature or slightly above).

In some instances as illustrated in FIG. 1, prior to packaging, the baked goods will pass through a conventional treatment apparatus. Prior to encountering the conventional treatment apparatus, the baked goods are assembled into batches. In batches, the baked goods are transported through the conventional treatment apparatus where a treatment fluid containing a preservative is applied to an external surface of the baked goods. Typical preservatives can include a wide variety of substances (i.e., microbiocidal substances, anti-microbial substances, etc.) such as acetic acid, lactic acid, carbonic acid, mixtures thereof, and the like. Preservatives have the ability to radically drop the pH of food products and, as such, can eradicate and/or eliminate any bacteria present within the food product. The treatment fluid can comprise a preservative or a mixture containing the preservative. For example, a vaporized mixture of carbon dioxide and acetic acid can be employed as the treatment fluid.

Figure 2:
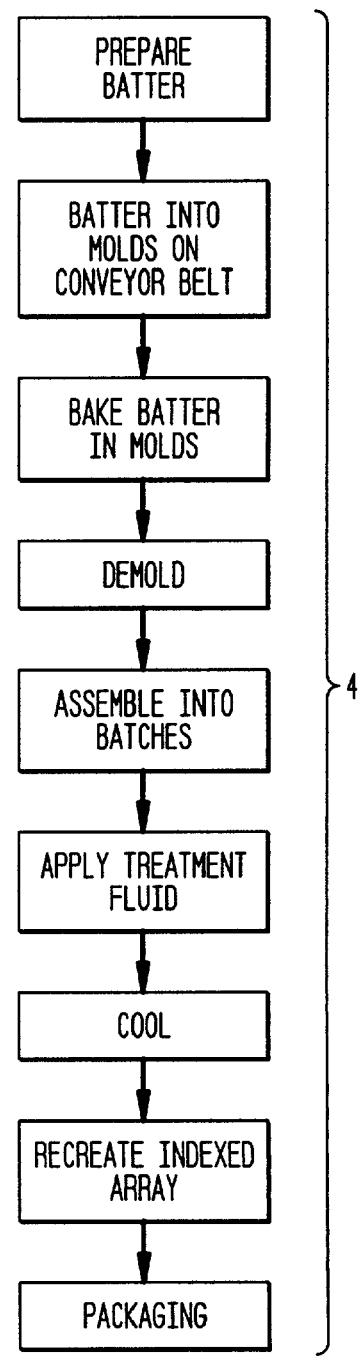
FIG. 2 illustrates a schematic flow diagram of another embodiment of a process for preparing a baked food product.

In other instances, as illustrated by flow diagram 4 in FIG. 2, placement of the cooling tunnel and the conventional treatment apparatus are reversed. In other words, the baked goods are de-molded, assembled into batches, treated with the treatment fluid, cooled, restored to the indexed array, and then packaged.

Figure 3:
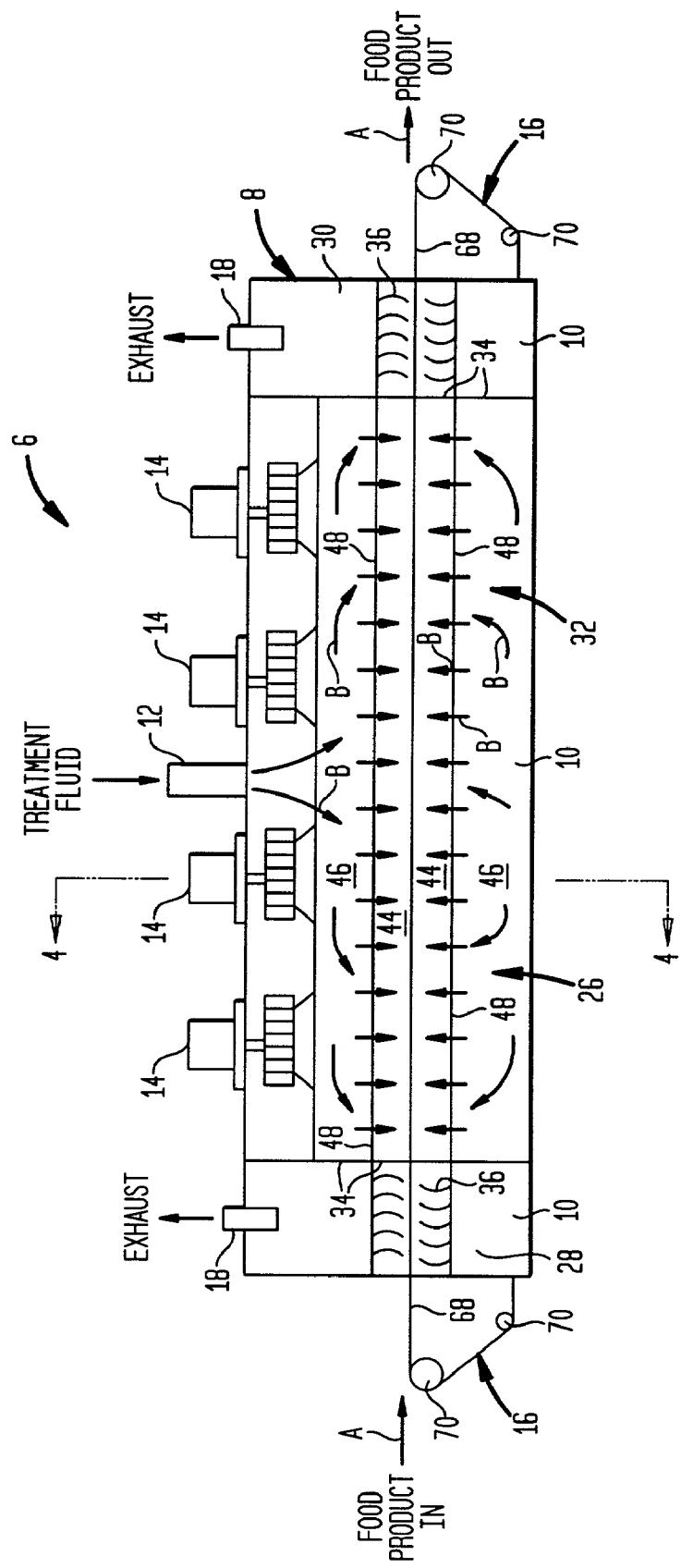
FIG. 3 illustrates a cross-sectional, side elevational view of an embodiment of a treatment apparatus according to the present invention capable of use with the processes of FIGS. 1 and 2.
Figure 4:
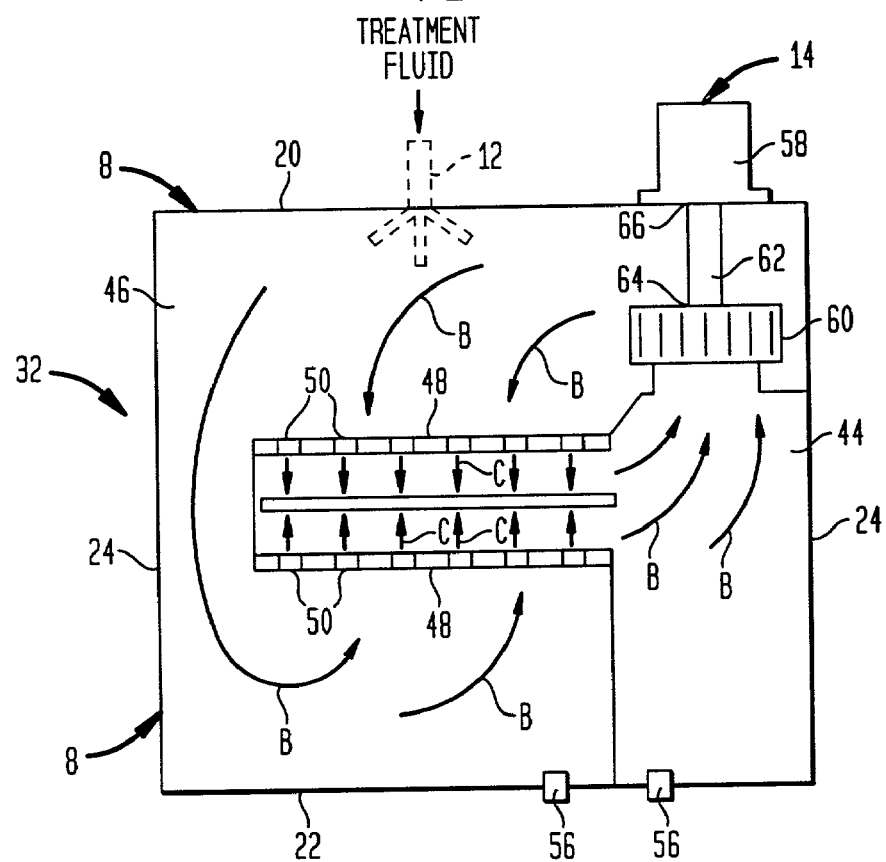
FIG. 4 illustrates a cross sectional, end elevational view of the treatment apparatus according to the present invention taken along line 4—4 of FIG. 3.

Referring to FIGS. 3 and 4, a preferred embodiment of a treatment apparatus 6 according to the present invention is illustrated. The treatment apparatus 6 is capable of continuously processing and/or treating a continuous supply of "food products" (not shown) that are delivered to the treatment apparatus on a continuous basis. Thus, as used herein, unless specifically stated otherwise, the phrases "food product" or "food products" refer to one or more food products that can be provided to a treatment apparatus on a continual basis.

Treatment apparatus 6 includes a housing 8, a plurality of chambers 10, treatment fluid conduit 12, one or more circulation fan assemblies 14, and conveyor mechanism 16. Treatment apparatus 6 can further comprise one or a plurality of exhaust conduits 18.

The housing 8 can be constructed of a variety of materials, such as stainless steel, and in a variety of shapes, such as rectangular, cylindrical, and the like. Housing 8 includes a top 20, a bottom 22, and a periphery 24 of sidewalls as well as an interior volume 26 within the housing.

Referring to FIG. 3, plurality of chambers 10 includes entry chamber 28, discharge chamber 30, and treatment chamber 32. Chambers 28, 30, 32 can be separated from each other by baffles 34 or other structural separating members. Baffles 34 can be constructed of fluid-impervious materials such as rubber, thin stainless steel, ultra-high molecular weight polyethylene (UHMW), are flexible, and do not substantially interfere with the transportation of the food product through chambers 28, 30, 32 and treatment apparatus 6. Baffles 34 can inhibit and/or prevent escape of the treatment fluid from treatment chamber 32. In that regard, the baffles 34 help to retain the treatment fluid dispensed into the housing 8. However, in preferred embodiments, baffles 34 do not cause or result in the substantial elevation of pressures within treatment chamber 32.

Entry chamber 28 occupies that portion of interior volume 26 within housing 8 where the food product is received from conveyor mechanism 16 and enters the housing. Therefore, when food product is delivered to treatment apparatus 6, the food product temporarily resides and is disposed within entry chamber 28. Entry chamber 28 is typically at an ambient pressure since the entry chamber is exposed to atmosphere outside housing 8.

Discharge chamber 30 occupies that portion of interior volume 26 within housing 8 where the food product is expelled by conveyor mechanism 16 and leaves the housing. Therefore, just prior to the food product being removed from treatment apparatus 6, the food product temporarily resides and is disposed within discharge chamber 30. Discharge chamber 30 is typically at an ambient pressure since the discharge chamber is exposed to atmosphere outside housing 8.

As show in FIG. 3, each of entry chamber 28 and discharge chamber 30 can also include one or more internal baffles 36. Internal baffles 36 can be constructed of fluid-impervious materials such as rubber, thin stainless steel, ultra-high molecular weight polyethylene (UHMW), are flexible, and do not substantially interfere with the transportation of the food product through chambers 28, 30 and/or treatment apparatus 6. Internal baffles 36 within chambers 28, 30 can be secured to housing 8 at various locales and can project away from the location of securement at a variety of angles and directions. Internal baffles 36 can inhibit and/or prevent escape of the treatment fluid from housing 8 and/or treatment apparatus 6.

The entry chamber 28 and discharge chamber 30 can each employ an exhaust conduit 18. Exhaust conduits 18 can be associated with a remote mounted fan (not shown) and motor (not shown). The fan and motor can be disposed or secured on, for example, the roof of the processing plant. Although not shown, it is contemplated that the remote fan can comprise a radial-style fan, a centrifugal fan, or a like device known in the art for exhausting gases and/or fluids.

Exhaust conduits 18 can permit the removal of any treatment fluid and/or other substances (e.g. gases) that have undesirably seeped from treatment chamber 32 into to entry chamber 28 and/or discharge chamber 30. Thus, when the remote fan and motor combination is operated, exhaust conduits 18 can inhibit and/or prevent treatment fluid from escaping housing 8 where receipt and discharge of the food product is performed by conveyor mechanism 16. Exhaust conduits 18 attempt to ensure that the treatment fluid is kept sufficiently distant from the atmosphere surrounding housing 8 and/or treatment apparatus 6.

As shown in FIGS. 3 and 4, treatment chamber 32 includes a treatment zone 44 and a fluid delivery zone 46. Treatment zone 44 and fluid delivery zone 46 are separated within treatment chamber 32 by one or more impingement plates 48.

Fluid delivery zone 46 is that portion of treatment chamber 32 that is proximate and associated with treatment fluid conduit 12. Treatment fluid conduit 12 is operable to supply and/or deliver the treatment fluid to fluid delivery zone 46 within treatment chamber 32. Although not shown, treatment fluid conduit 12 can employ nozzles, atomizers, and like devices to deliver the treatment fluid to the fluid delivery zone 46 within treatment apparatus 6. Thus, treatment fluid conduit 12 can deliver the treatment fluid in a variety of configurations, such as preferably a jet, vapor, mist, fog, and the like. As used herein, the term "jet" means a forceful stream of fluid (e.g., liquid, gas, or combination thereof).

In preferred embodiments, the treatment fluid is circulated and/or distributed throughout fluid delivery zone 46 in a substantially uniform manner and, therefore, flows approximately evenly through impingement apertures 50. Thus, the concentration of treatment fluid throughout the treatment chamber 44 can also be substantially uniform. This can improve the coverage of the treatment fluid upon the food product.

Treatment zone 44 is that portion of treatment chamber 32 that is proximate and associated with conveyor mechanism 16 and circulation fan assembly 14. Treatment zone 44 can exist at approximately an ambient pressure. As used herein, the ambient pressure is defined as a pressure that can be slightly negative but still at or near pressure existing outside housing 8. In other words, ambient pressure is a pressure that is not significantly reduced by, for example, vacuum pumps.

While treatment zone 44 typically remains at the ambient pressure, fluid delivery zone 46 exists at an elevated and/or positive pressure (i.e., some pressure above, or elevated from, the ambient pressure). The elevated pressure within fluid delivery zone 46 is produced when the treatment fluid is supplied to the fluid delivery zone faster than the treatment fluid can be expelled from the fluid delivery zone. The difference in pressure between fluid delivery zone 46 and treatment zone 44 (e.g., approximately elevated versus ambient) helps to force the treatment fluid to flow through impingement apertures 50 (i.e., perforations) in impingement plates 48 which separate the fluid delivery zone and the treatment zone. The pressure differential is primarily the result of employing the fan assembly 14 discussed below.

Figure 5:
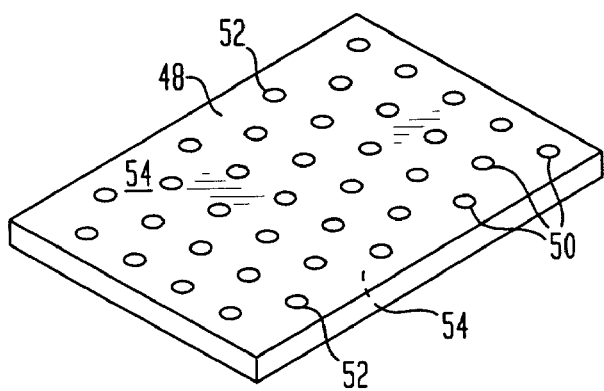
FIG. 5 illustrates a perspective view of a portion of an impingement plate from FIG. 4.

As shown in FIGS. 4 and 5, in preferred embodiments impingement plates 48 comprise longitudinal members of corrosion-resistant, fluid-impermeable material such as stainless steel, ultra-high molecular weight polyethylene (UHMW), other plastics, and the like, formed as plates. Impingement plates 48 include at least one impingement aperture 50 and, as illustrated in FIG. 5, preferably contain a plurality of the impingement apertures. Impingement apertures 50 provide the treatment fluid with a path or route in which to flow through impingement plates 48. The apertures 50 provide fluid communication between the delivery zone 46 and treatment zone 48.

Impingement apertures 50 can comprise a variety of shapes, contours, lengths, depths, and the like. Further, impingement apertures 50 can be variably distributed within and upon impingement plates 48. As shown in FIG. 5, impingement aperture openings 52 can be arranged upon surfaces 54 of impingement plates 48 in an array, a pattern, randomly, or some combination thereof. The placement of impingement apertures 50 can be configured and/or organized to control (e.g., increase) velocity or flow of the treatment fluid, alter the path of the treatment fluid through impingement plates 48, change concentration of the treatment fluid within treatment zone 44, and the like.

Figure 5A:
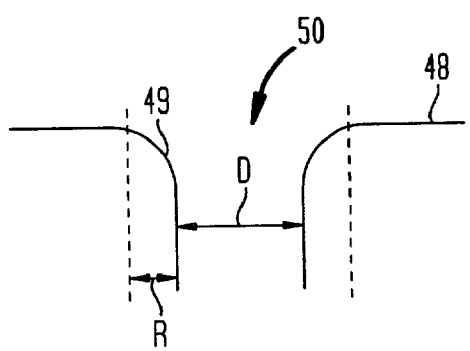
FIG. 5A is a cross sectional view of a feature of the impingement plate of FIG. 5.

Referring also to FIG. 5A, there is shown in more detail the cross section of the impingement aperture 50 of the plate 48. The aperture 50 has a diameter D. A radius R of a bend 49 circumscribes the aperture 50 and has a value equal to fifteen percent (15%) of the diameter D of the aperture. The radius R is measured from where a planar surface of the plate 48 commences to bend at 49 through a ninety (90) degree angle from the planar surface of the plate. This preferred ratio provides for a more uniform flow of the treatment fluid from the fluid delivery zone 46 to the fluid treatment zone 44 under the effect of the circulation fan assembly 14, and facilitates more uniform impingement of the fluid jet, for example, onto the food product.

In FIG. 3, the direction of the food product through treatment apparatus 6 is shown as indicated by directional arrows A. Also illustrated in FIGS. 3 and 4, the direction and/or path of various fluids (e.g., a treatment gas, a treatment gas mixed with a carrier gas, used and excess treatment fluid, air, other gases and fluids, etc.) through treatment apparatus 6, the plurality of chambers 10, treatment chamber 32 (from fluid delivery zone 46, through impingement apertures 50 in impingement plates 48, and into treatment zone 44) is shown by directional arrows B.

In FIG. 4, treatment chamber 32 can include one or more drains 56 penetrating housing 8. Drains 56 can permit excess treatment fluid, among other substances, to be expelled from fluid delivery zone 46 and treatment zone 44 within treatment chamber 32. Typically, drains 56 permit the removal of treatment fluid that has condensed and, therefore, in preferred embodiments the drains are disposed proximate bottom 22 of housing 8.

The treatment fluid conduit 12 includes an elongate member, such as a pipe or a tube, secured to top 20 of housing 8 proximate treatment chamber 32. Treatment fluid conduit 12 can be fabricated of a non-corrosive material such as stainless steel, ultra-high molecular weight polyethylene (UHMW), other plastics, and the like and functions to provide ingress and delivery of the treatment fluid to treatment chamber 32. One or more treatment fluid conduits 12 can be associated with housing 8 at various locales (e.g., top 20, bottom 22, and/or periphery 24 or sides) and deliver the treatment fluid to fluid delivery zone 46 within treatment chamber 32 as desired.

In a preferred embodiment, circulation fan assembly 14 comprises motor 58, fan 60, and motor shaft 62. Motor 58 can be any conventionally used electric motor, gas motor, and the like, operable to power fan 60. Motor 58 can be secured, in preferred embodiments, to top 20 of housing 8. Fan 60 can be disposed at one end 64 of motor shaft 62 such that the fan extends into, or is otherwise associated with, treatment zone 44 in treatment chamber 32. End 66 of motor shaft 62 can be associated with motor 58 such that the motor can operate fan 60. When operated, fan 60 circulates or delivers gases and/or fluids from treatment zone 44 to fluid delivery zone 46. As such, circulation fan assembly 14 can recycle any remaining and/or excess treatment fluid and/or other substances from treatment zone 44 within treatment chamber 32. The fan assembly 14 draws the treatment fluid from the zone 46 through the impingement apertures 50 into the zone 44 for impingement onto the food product at a substantially ambient pressure.

As shown in FIG. 3, conveyor mechanism 16 includes a conveyor belt 68 and rollers 70. All or a portion of conveyor belt 68 can travel through treatment apparatus 6. Also, conveyor mechanism 16, and in particular conveyor belt 68, are capable of receiving and introducing the food product into housing 8 of treatment apparatus 6, thereafter transferring or progressing the food product through the treatment apparatus, and then delivering or expelling the treated food product from the housing and the treatment apparatus. In preferred embodiments, at least one of rollers 70 accepts torque from a drive motor (not shown). Further, conveyor belt 68 can beneficially contain perforations or apertures (not shown) to provide the treatment fluid with increased access to those food products disposed upon the conveyor belt. Additionally, it is contemplated that conveyor belt 68 can be comprised of links, be constructed of an "open mesh" material, and the like.

Despite numerous ingress and egress appliances and/or components being described as conduits (e.g., exhaust conduit 18, treatment fluid conduit 12), various pipes, fixtures, fittings, and the like, are contemplated and can be employed in place of the conduits to provide treatment apparatus 6 with the same or similar benefit.

In operation, the food product travels on the conveyor mechanism 16, typically upon apertured conveyor belt 68, towards housing 8. Upon reaching housing 8, the food product is introduced into entry chamber 28 by conveyor mechanism 16. As such, the food product temporarily resides within entry chamber 28 as conveyor mechanism 16 operates and conveyor belt 68 progresses. Further or continuing movement of conveyor belt 68 causes the food product within entry chamber 28 to be transferred from the entry chamber to treatment zone 44 within treatment chamber 32.

While the food product is disposed within treatment zone 44, the treatment fluid is discharged (or continues to be discharged) by treatment fluid conduit 12 into fluid delivery zone 46. The treatment fluid expelled by treatment fluid conduit 12 generates and/or maintains positive pressure within the fluid delivery zone. Therefore, the treatment fluid, under positive pressure, is forced from fluid delivery zone 46, and into treatment zone 44, by passing through impingement apertures 50. When the treatment fluid passes through impingement apertures 50, a jet, a spray, and/or a stream of the treatment fluid is produced. As the fluid constricts to pass through impingement apertures 50, the velocity of the treatment fluid can be dramatically increased. The jets of treatment fluid shoot into treatment zone 44, as illustrated by directional arrows B in FIGS. 3 and 4, where the food product is progressing and/or residing.

As the jets of treatment fluid enter treatment zone 44, the treatment fluid jets impinge upon, strike, impact, and/or hit the food product disposed upon conveyor belt 68. Therefore, the food product is treated with the treatment fluid by impingement. Notably, treatment of the food product occurs without a vacuum (or significant negative pressure) existing within treatment zone 44, due to the "drawing" effect of the fan assembly 14. The treatment zone is free to remain at a relatively or approximately ambient pressure during the treatment process.

In preferred embodiments, the treatment fluid impinges the food product disposed on conveyor belt 68 at approximately a right angle. In other words, the jets of treatment fluid are substantially perpendicular to the food product as the food product rests upon and/or within conveyor belt 68. When the jets of treatment fluid strike the food product at right angles, application of the treatment fluid can be enhanced and/or improved. Correspondingly, absorption of the treatment fluid by the food product can also be enhanced and/or improved.

The amount of time that the food product spends within treatment zone 44 (i.e., the amount of time that the food product is exposed to the jets of treatment fluid) and the level, magnitude, and/or degree of treatment that the food product receives can directly correlate to the speed of conveyor belt 68. Conveyor belt 68 speed can be increased or decreased, as desired, to ensure and/or dictate that the food product spends an appropriate amount of time within treatment zone 44 to ensure sufficient treatment.

In a preferred embodiment, the speed of conveyor belt 68 is such that the food product will experience treatment zone 44 for approximately thirty to forty seconds. This thirty to forty seconds is longer than the amount of time typically used by a conventional treatment apparatus (e.g., 25 to 30 seconds). The reason the food product is treated within treatment apparatus 6 for the longer period of time is to ensure that sufficient treatment of the food product occurs when vacuum pressure is absent. Therefore, while treatment apparatus 6 can take longer to treat the food product, the treatment apparatus can accomplish and/or perform treatment without the need for expensive vacuum pumps and associated equipment.

In one embodiment, the speed of conveyor belt 58 can be adjusted such that the food product remains within treatment zone 44 for approximately a minute and a half to two minutes (e.g., about three to four times longer than the food product spends in the convention treatment apparatus).

In exemplary embodiments, conveyor belt 68 contains apertures or perforations, comprises a series of links, and/or has an "open mesh" design to provide the treatment fluid with substantial and/or improved access to all sides of the food product. The apertures augment the amount of surface area on the food product which can be impinged by the jets of treatment fluid.

As, and after, impinging upon the food product, the treatment fluid can remain within treatment zone 44, circulate into fluid delivery zone 46 through fan 60, and/or seep from treatment zone 44 into either or both of entry chamber 28 and discharge chamber 30. Since exhaust conduit 18 and fan 60 can continually evacuate and/or exhaust used and excess treatment fluid, gases, and the like, the exhaust conduit and fan can offset or "cancel out" any increase in pressure within treatment zone 44 that might otherwise occur due to injection of the treatment fluid in pressurized streams. In other words, exhaust conduit 18 and fan 60 can each remove treatment fluid and/or other substances from treatment zone 44 as quickly as the treatment fluid is introduced into the treatment zone. Thus, the ambient pressure within treatment zone 44 can be approximately or substantially maintained.

Referring to FIG. 3, after experiencing treatment zone 44 within treatment chamber 32, the food product travels upon conveyor belt 68 from the treatment chamber to discharge chamber 30. The food product temporarily resides within discharge chamber 30 where unused and/or excess treatment fluid and/or other substances can be removed by exhaust mechanism 18. Progression of conveyor belt 68 causes the food product within discharge chamber 30 to eventually be expelled from the discharge chamber. From there, the food product can be packaged and/or otherwise handled.

By using conveyor mechanism 16, treatment apparatus 6 is capable of providing treatment to a continuous supply of the food product. The food product can travel by operation of conveyor mechanism 16 through treatment apparatus 6 on a continuous and/or uninterrupted basis in, for example, the indexed array without having to be assembled into batches. In preferred embodiments, movement and/or progression of conveyor mechanism 16 is enduring and/or perpetual over extended periods of time. Therefore, time delays in assembling the batches, as well as numerous pieces of batch assembly equipment, can be eliminated from the food product treatment process. Likewise, a buffer tank and associated equipment is unnecessary.

In preferred embodiments, movement and/or progression of conveyor mechanism 16 is enduring and/or perpetual over extended periods of time. However, it is also contemplated that operation of conveyor mechanism 16 can be selectively irregular, intermittent, briefly paused, and/or some combination thereof, while still possessing the ability to accommodate the continuous supply of food product. For example, movement of conveyor belt 68 can be temporarily paused or halted depending on properties of conveyor mechanism 16 (e.g., rate and/or acceleration of the conveyor belt) which depend on, for example, the type of food product being treated, the time treatment chamber 32 needs to perform its designated functions, efficiency of associated components (e.g., treatment fluid conduit 12, circulation fan assembly 14, and the like), along with a host of other factors. Despite any temporary cessation of movement of conveyor belt 68, treatment apparatus 6 can still accommodate the continuous supply of food product and does not require the assembly of batches.

The terms continuous supply, continual supply, continuing supply, and the like, are defined as an unbroken, enduring and/or perpetual quantity of, for example, the food product. However, as used herein, the scope of the terms can also include a broken, intermittent, discontinuous, and/or irregular quantity of the food product that is repeated, recurring, and/or persistent. In other words, the continuous, continual, and/or continuing supply of the food product can be delivered in an uninterrupted and unbroken chain of the food product, a series of chains of the food product, and/or some combination thereof.

Figure 6:
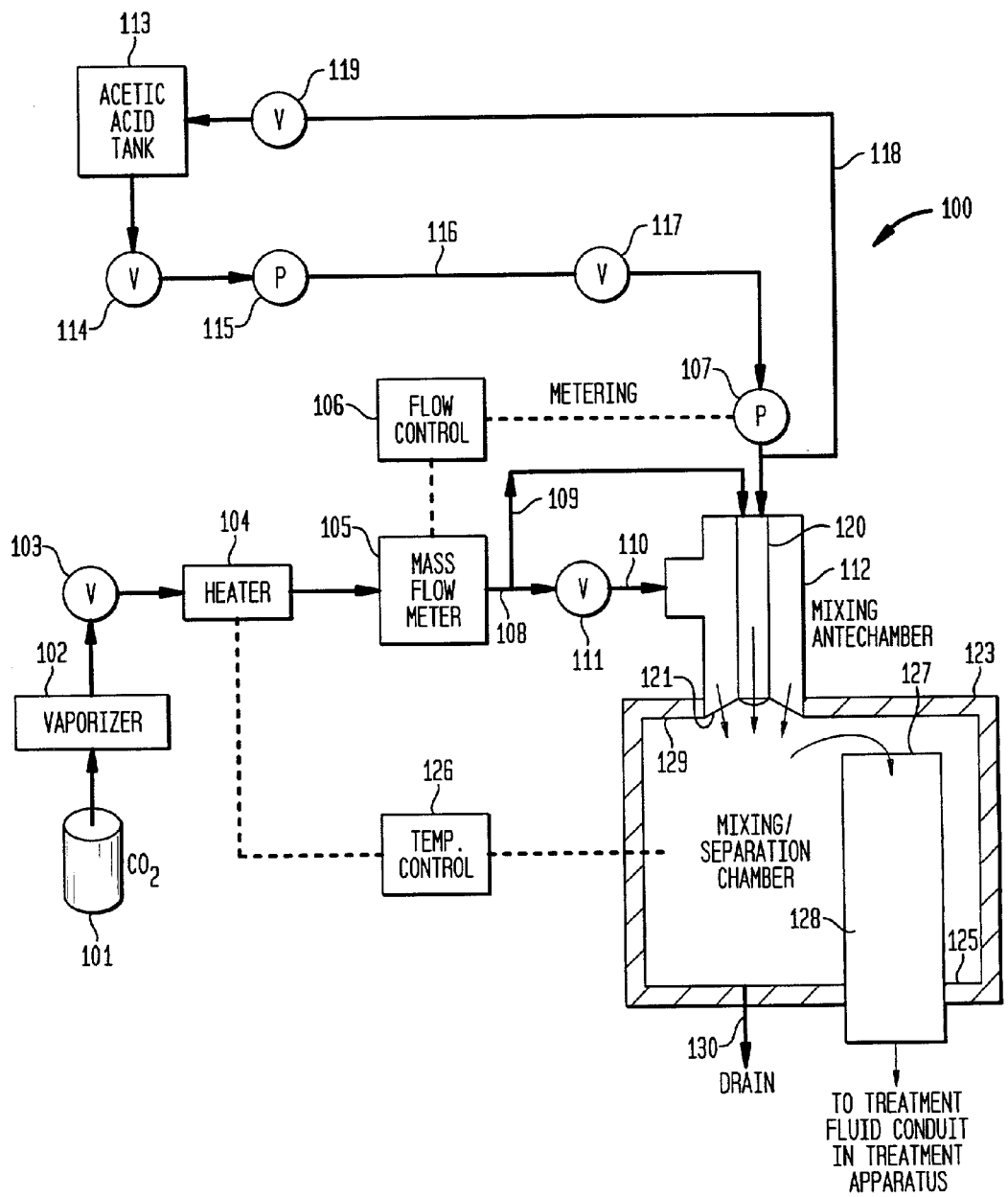
FIG. 6 illustrates a schematic flow diagram for one embodiment of a treatment fluid generation system capable of employing the treatment apparatus of FIG. 3.

Preferably, treatment apparatus 6 is employed within fluid generation system 100, as illustrated in FIG. 6, capable of mixing a carrier gas and vaporized liquid with little, if any, entrained droplets. In fluid generation system 100, tank 101 holds liquid carbon dioxide, typically at about three hundred (300) psig. Liquid carbon dioxide is transferred to vaporizer 102 and converted to a gas substantially, if not completely, free of any droplets. The gas is then passed through pressure reduction valve 103 and the pressure of the gas is dropped from three hundred (300) psig to one hundred (100) psig. The gaseous $CO_2$ is then transferred to heater 104 and heated to essentially the same temperature as the contents of mixing/separation chamber 123 (e.g., 140° F.). Temperature control unit 126 coordinates the temperature of heater 104 and of chamber 123. From heater 104, the gaseous carbon dioxide at one hundred (100) psig is transferred to mass flow meter 105, which is controlled by flow control 106. As long as pump 107 is in proper operation, flow control 106 allows carbon dioxide to move from mass flow meter 105 into pipe 108. Pipe 108 divides into pipes 109 and 110. While the amount of carbon dioxide each of pipes 109 and 110 will carry can vary, typically pipe 109 will carry about ten percent (10%) weight and pipe 110 will carry the remaining about ninety percent (90%) weight of the carbon dioxide. The stream of carbon dioxide passing through in pipe 110 can also passes through control valve 111 before entering mixing antechamber 112.

Liquid acetic acid is removed from tank 113 through check valve 114 by the action of pump 115. The liquid acetic acid moves through line 116 and valve 117 into metering pump 107. If atomization nozzle 120 is operational, then the liquid acetic acid is fed into the atomization nozzle where the liquid acetic acid is atomized with carbon dioxide delivered to the nozzle through line 109. If atomization nozzle 120 is not operative, then the liquid acetic acid is returned to tank 113 by way of line 118 and check valve 119.

Atomized acetic acid is transferred from atomization nozzle 120 into the upper section of mixing/separation chamber 123 in which it is vaporized by contact with carbon dioxide delivered from mixing antechamber 112 through orifice plate 121. The carbon dioxide delivered from line 110 into antechamber 112 passes through pressure reduction valve 111 in which the pressure of the carbon dioxide is reduced from one hundred (100) psig to about five (5) psig. The pressure of the atomized acetic acid as delivered to mixing/separation chamber 123 is also about five (5) psig. The temperature, pressure and volume of carbon dioxide introduced into the upper section of mixing/separation chamber 123 is sufficient such that the atomized acetic acid is essentially completely vaporized upon contact with it.

Atomization nozzle 120 passes through antechamber 112 and orifice plate 121, and is in communication with the upper section of mixing/separation chamber 123. Atomization nozzle 120 can extend into the upper section of mixing/separation chamber 123 any convenient length, but typically the end of the nozzle is flush with or extends only a short distance beyond orifice plate 121.

Figure 7:
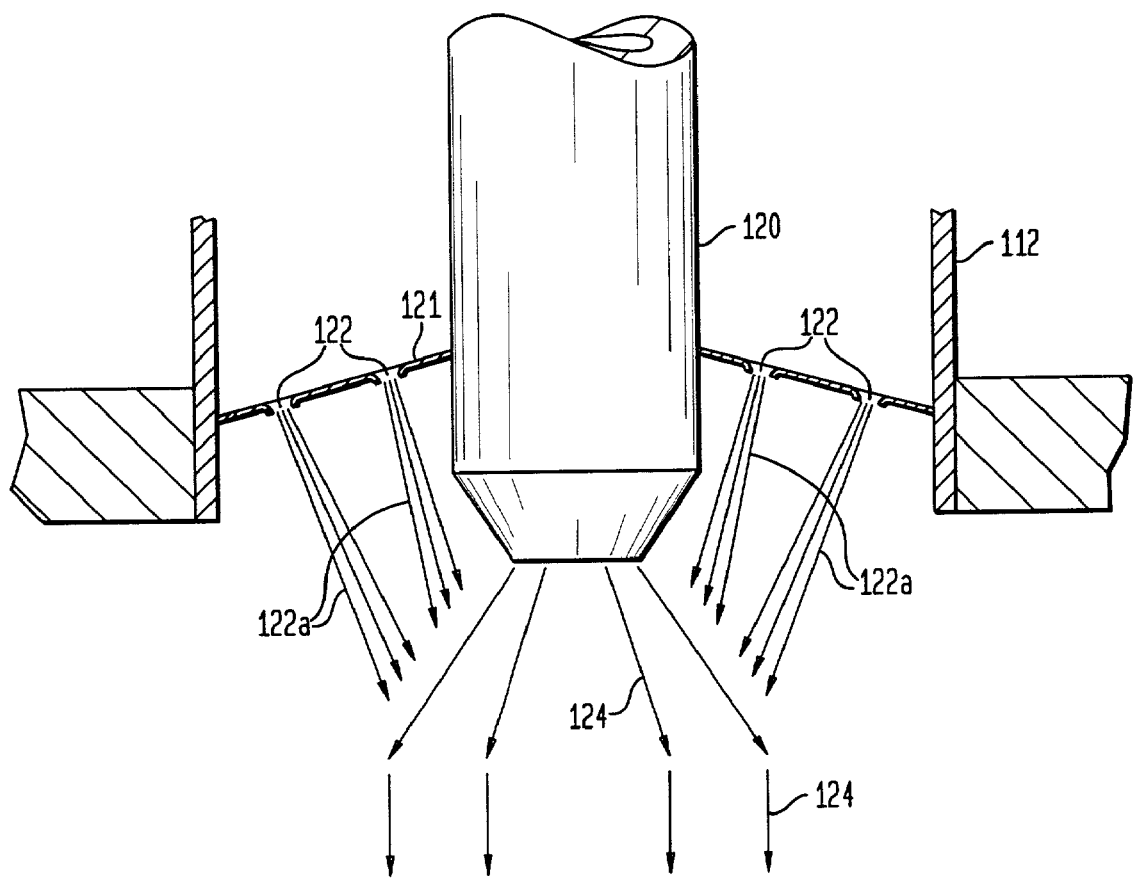
FIG. 7 illustrates an enlarged schematic of the mixing zone of FIG. 6.

Referring to FIG. 7, orifice plate 121 separates antechamber 112 from the upper section of mixing/separation chamber 123, and it encircles the lower end of atomization nozzle 120. Typically, orifice plate 121 is located in the entry port of chamber ceiling or top wall 129, and it is angled in such a manner that at least one and preferably a plurality of orifices 122 are slanted in the direction of atomized mixture spray 124. The number, size and position of orifices 122 in orifice plate 121 can vary. In a preferred embodiment, orifice plate 121 is heated.

Carbon dioxide gas moves under a positive pressure from antechamber 112 into spray 124, which is discharged from the end of atomization nozzle 120. The area in the upper section of mixing/separation chamber 123 in which carbon dioxide gas 122a impinges upon spray 124 is the mixing zone of the chamber. The remainder of mixing/separation chamber 123 is the separation zone, which includes virtually all of the lower section of the chamber. Within the mixing zone, the atomized acetic acid is vaporized into gaseous acetic acid and residual acetic acid droplets.

Referring again to FIG. 6, the residual acetic acid droplets separate gravitationally from the mixture of gaseous carbon dioxide and acetic acid as this mixture circulates about the separation zone of chamber 123. Eventually the residual acetic acid droplets collect on floor 125 of chamber 123. In a preferred embodiment, floor 125 is heated to promote evaporation of the collected residual acetic acid droplets. Alternatively or in combination with the heated floor, the residual acetic acid droplets are continuously or periodically withdrawn from chamber 123 through drain 130.

Mixing/separation chamber 123 is made of any conventional material, is well insulated, and is constructed to hold a positive pressure (e.g., between about five to twenty (5–20) psig). Chamber 123 is equipped with a temperature sensor (not shown) which is connected to temperature control 126 which in turn is connected to heater 104. Temperature control 106 adjusts heater 104 to raise the temperature of the carbon dioxide fed into antechamber 112 so as to maintain a desired temperature (e.g., 140° F.), in mixing/separation chamber 123. Chamber 123 can also be equipped with a pressure sensor and pressure relief valve (both of which are not shown). The pressure sensor (not shown) can relay information to pump 107 and/or mass flow meter 105.

Occasionally, a small amount of residual droplets of acetic acid pass into the separation zone of chamber 123. This mixture of gaseous carbon dioxide and acetic acid and residual acetic acid droplets is under a positive pressure and as such, it disburses throughout the internal volume of chamber 123 (except the mixing zone which itself is under positive pressure from both the mixture ejected from atomization nozzle 120 and the carbon dioxide ejected from antechamber 112). This positive pressure eventually forces the gaseous acetic acid free of a substantial amount of the residual droplets through entrance port 127, into and though exit conduit 128, and eventually out of chamber 123. Since entrance port 127 of discharge conduit 128 is located in the upper section, preferably near ceiling 129 of chamber 123, most, if not all, of the residual droplets of acetic acid have separated from the gaseous mixture due to the influence of gravity. These droplets will condense on the internal walls of chamber 123 and the external walls of exit conduit 128, eventually collecting on floor 125.

The application of the gaseous mixture of carbon dioxide and vaporous acetic acid discharged at conduit 128 from fluid generation system 100 is provided to the treatment apparatus 6 at treatment fluid conduit 12. As such, the mixture can be applied to the food product on a continuous basis to correspond to the continuous basis of the vaporization of liquid acetic acid with gaseous carbon dioxide. Thus, the need for a conventional buffer tank is eliminated. The gaseous mixture discharged from exit conduit 128 is transferred directly, in preferred embodiments, to treatment apparatus 6.

Commonly-owned, co-pending U.S. patent application Ser. No. 09/819,513 filed Mar. 28, 2001, entitled "Apparatus and Method for Mixing a Gas and a Liquid" discloses other and various embodiments and components within a fluid generation system and, therefore, the contents and disclosure of that application are incorporated into the present application by this reference as if fully set forth herein.

Further, commonly-owned, co-pending U.S. patent application Ser. No. 10/141,166 entitled "Apparatus and Method for Providing Treatment to a Continuous Supply of Food Product Using a Vacuum Process" filed May 7, 2002, U.S. patent application Ser. No. 10/164,159 entitled "System and Method of Using Non-Volatile Microbiocidal Application Agents" filed Jun. 6, 2002, and U.S. patent application Ser. No. 10/199,782 entitled "System and Method of Microbiocidal Gas Generation" filed Jul. 22, 2002, disclose other and various embodiments and components within a fluid generation system and, therefore, the contents and disclosure of these applications are incorporated into the present application by reference as if fully set forth herein.

Despite any methods being outlined in a step-by-step sequence, the completion of acts or steps in a particular chronological order is not mandatory. Further, elimination, modification, rearrangement, combination, reordering, or the like, of acts or steps is contemplated and considered within the scope of the description and appended claims. Various items of equipment, such as fittings, valves, mountings, pipes, sensors, monitoring equipment, wiring, and the like have been omitted to simplify the description. However, such conventional equipment and its uses are known to those skilled in the art and can be employed as desired.

While the present invention has been described in terms of the preferred embodiment, it is recognized that equivalents, alternatives, and modifications, aside from those expressly stated, are possible and within the scope of the appended claims.

What is claimed is:

1. A method of impinging a baked good with treatment fluid, comprising:

providing a treatment fluid at a first zone and the baked good to be treated at a second zone, wherein providing the treatment fluid in the first zone elevates the pressure of the first zone;

separating the first zone from the second zone with a separation means;

providing a passageway of select construction through the separation means for controlling the concentration of the treatment fluid introduced to the second zone;

drawing the treatment fluid from the first zone into the second zone through the passageway by difference in pressure between the first zone and the second zone;

dispensing the treatment fluid from the passageway into the second zone as a jet, wherein the treatment fluid comprises a mixture of gaseous carbon dioxide and a vaporous preservative;

impinging the baked good in the second zone with the jet of the treatment fluid;

continuously conveying the baked good through the second zone for being impinged with the jet; and circulating unused treatment fluid from the second zone to the first zone.

2. The method according to claim 1, wherein impinging occurs at substantially ambient pressure.

3. The method according to claim 1, further comprising: retaining the treatment fluid jet from escaping the second zone where dispensed.

4. The method according to claim 1, wherein impinging the baked good is at different surfaces of the food product.

5. The method according to claim 1, wherein the vaporous preservative is vaporized acetic acid.

* * * * *

UNITED STATES PATENT AND TRADEMARK OFFICE
CERTIFICATE OF CORRECTION

PATENT NO. : 7,008,658 B2  Page 1 of 1
APPLICATION NO. : 10/157368
DATED : March 7, 2006
INVENTOR(S) : Newman et al.

It is certified that error appears in the above-identified patent and that said Letters Patent is hereby corrected as shown below:

In the title: Item [54]

Please insert
      A METHOD FOR PROVIDING TREATMENT TO A CONTINUOUS SUPPLY OF BAKED GOOD BY IMPINGEMENT Signed and Sealed this Ninth Day of January, 2007

JON W. DUDAS
*Director of the United States Patent and Trademark Office*